United States Patent [19]

Gallusser et al.

[11] 4,359,256

[45] Nov. 16, 1982

[54] ELECTRICAL CONNECTOR COUPLING MEMBER

[75] Inventors: David O. Gallusser, Oneonta; Gene L. Snyder, Bainbridge; Robert W. Brush; Carl R. Joslyn, both of Unadilla, all of N.Y.

[73] Assignee: The Bendix Corporation, Southfield, Mich.

[21] Appl. No.: 206,774

[22] Filed: Nov. 14, 1980

[51] Int. Cl.³ ............................................. H01R 13/639
[52] U.S. Cl. ............................ 339/90 R; 339/DIG. 2
[58] Field of Search ................. 339/DIG. 2, 89, 90, 339/187–190

[56] References Cited

U.S. PATENT DOCUMENTS

| | | | |
|---|---|---|---|
| 1,975,467 | 10/1934 | Livingston | 173/328 |
| 2,984,811 | 5/1961 | Hennessey, Jr. et al. | 339/45 |
| 3,901,574 | 8/1975 | Paullus et al. | 339/90 R |
| 4,168,105 | 9/1979 | Herrmann, Jr. | 339/90 R |
| 4,235,498 | 11/1980 | Snyder | 339/90 R |

FOREIGN PATENT DOCUMENTS 1910961 9/1969 Fed. Rep. of Germany .
748454 5/1956 United Kingdom .

Primary Examiner—John McQuade
Attorney, Agent, or Firm—Raymond J. Eifler

[57] ABSTRACT

The invention described is a plastic electrical connector characterized by a coupling ring 1 having two elongated apertures 11 and 14, one of which 14 receives a pin 21 on another housing 2. The elongated aperture 11 allows the portion 16 between the apertures 11 and 14 to deflect when the pin 21 travels between recesses 15 in one side of aperture 14 thereby providing a bias against the coupling ring 1 that helps to prevent accidental uncoupling of the housings 2 and 3.

6 Claims, 4 Drawing Figures

ELECTRICAL CONNECTOR COUPLING MEMBER

This invention relates to an electrical connector assembly of the type having a bayonet coupling.

An electrical connector assembly is generally comprised of two separate housings connected together by a coupling member mounted on one of the housings. In bayonet type couplings the coupling member on one housing includes an internal groove which mates with a pin on the other housing, so that when the coupling member is rotated, the housings are drawn together. Examples of an electrical connector having such a bayonet type coupling may be found in U.S. Pat. No. 2,984,811, issued May 16, 1961. To prevent accidental uncoupling of the connector housings the coupling ring is mounted to one of the housings with a wave washer to provide a rearward bias on the coupling ring in its fully mated position with the other housing. The bias increases the frictional force on the pin which retards accidental uncoupling of the housing.

DISCLOSURE OF THE INVENTION

This invention eliminates the need for a wave washer as one of the mounting elements of the coupling member of an electrical connector.

The invention is a plastic electrical connector characterized by a coupling member having two operations having a resiliently deflectable member between them one of which receives and positions a pin on a connector housing.

One advantage of the invention is that it provides multiple locking positions for the pin of a bayonet type electrical connector.

Another advantage of the invention is that it eliminates the need for a wave washer to provide a rearward bias on the coupling member of a connector assembly.

DETAILED DESCRIPTION OF THE INVENTION

Figure 1:
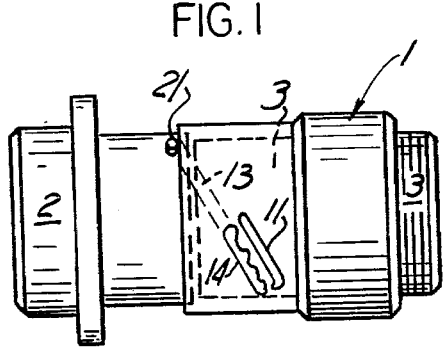
FIG. 1 illustrates an electrical connector housing utilizing the principles of the invention.
Figure 2:
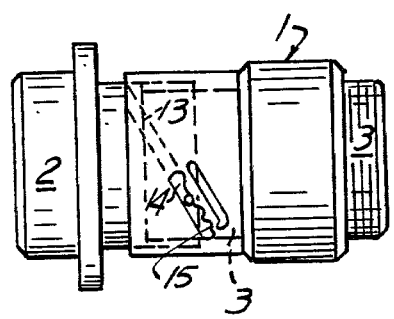
FIGS. 2 and 3 are other views of the connector shown in FIG. 1.
Figure 3:
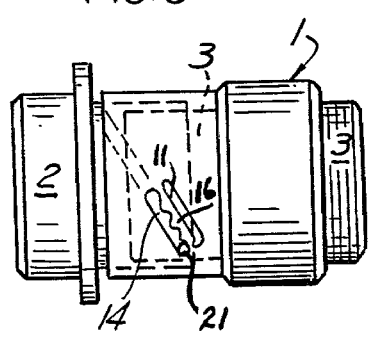

Referring now to the Drawings, FIGS. 1, 2 and 3 illustrate a connector assembly comprised of a first housing 2, a second housing 3, and a coupling ring 1. To mate the two housings the pin 21 is placed in the opening of the helical groove 13 and the coupling ring 1 is rotated. Rotation of the coupling ring 1 causes the pin to travel into the groove thereby drawing the housings together.

Figure 4:
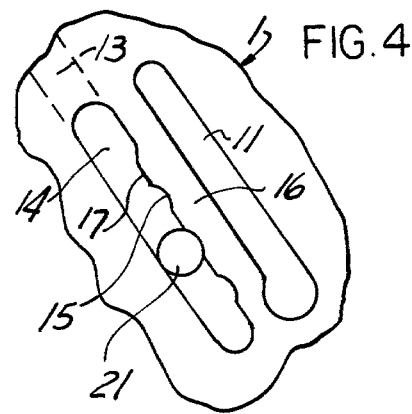
FIG. 4 illustrates a portion of the connector coupling ring shown in FIG. 1.

FIG. 4 is an exploded view of the opening 14 at the end of the groove 13. The opening 14 includes one or more recesses 15 which are adapted to receive the pin 12. Positioning of the pin 12 in any one of the three recesses prevents inadvertent rotation of the coupling ring 1 that could cause the housings to uncouple. Opening 11 and its enlarged end portion allows the solid portion 16 between opening 11 and 14 to deflect when the pin presses against the flat surface 17 as it travels inwardly when the coupling ring is rotated.

While a preferred embodiment of the invention has been disclosed, it will be apparent to those skilled in the art that changes may be made to the invention as set forth in the appended claims and, in some instances, certain features of the invention may be used to advantage without corresponding use of other features. Accordingly, it is intended that the illustrative and descriptive materials herein be used to illustrate the principles of the invention and not limit the scope thereof.

Having described the invention what is claimed is:

1. In combination with a coupling member of the type used for connecting together two connector housings wherein the coupling member is mounted to one of said housings, and wherein the forward connecting portion of said coupling member includes a groove on the inside thereof adapted to mate with a pin on other of said housings, the improvement wherein said coupling ring further comprises:
   a first elongated aperture located at one end of said groove and adapted to receive the pin; and
   a second elongated aperture generally parallel with said first aperture, said first and second apertures defining between then a resiliently deflectable portion.

2. The connector as recited in claim 1 wherein said first elongated aperture includes at least one recess adapted to receive the pin on said other housing.

3. The connector as recited in claim 1 or 2 wherein the central axis of said first elongated aperture and said groove is helical.

4. In combination with an electrical connector of the type having a first housing having a central axis, a forward mating portion and a member projecting radially outwardly from the outside surface of the forward mating portion of said housing, a second housing having a forward portion; a coupling member mounted to said second housing, said coupling member having in its forward portion a groove adapted to mate with the member projecting from said first housing, the improvement comprising:
   a first elongated aperture adapted to receive said member located at one end portion of said groove and extending through said coupling member; and
   a second elongated aperture in said coupling member generally parallel with said first aperture, said first and second apertures defining between then a resiliently deflectable portion.

5. The connector as recited in claim 4 wherein said first elongated aperture includes at least one recess adapted to receive the member projecting from said other housing.

6. The connector as recited in claim 4 or 5 wherein the central axis of said first elongated aperture and said groove is helical.

* * * * *